UNITED STATES PATENT OFFICE

SIDNEY G. SEATON, OF LA SALLE, ILLINOIS, ASSIGNOR TO UTICA HYDRAULIC CEMENT CO., OF UTICA, ILLINOIS, A CORPORATION OF ILLINOIS

PROCESS OF MAKING A CEMENT COMPOSITION

No Drawing.   Application filed September 13, 1929.   Serial No. 392,491.

This invention relates to a new and useful composition for increasing the plasticity and sand carrying qualities of cement and for water-proofing the same, and more particularly to a novel process for preparing such a composition.

Processes for water-proofing cement by incorporating in the cement a water-repellent composition have long been known. These compositions consist for the most part of a soap formed by treating a fatty acid with an alkali.

Another process for water-proofing cement is disclosed in the patent to Mas No. 982,620. Mas water-proofs cement by adding thereto a water-proofing agent formed by treating a dry powdered lime with solid non-oleaginous palmitin in a heated, melted condition. He also states that he may replace the lime by silica, clay, or any other mineral substance capable of being reduced in a mechanical way to a dry powder. However, Mas specifically states that in his process there is no chemical reaction or even partial saponification between the lime and the palmitin but that each minute particle of the powdered lime becomes externally coated with a thin film of palmitin and is thus rendered water-repellent.

I have now discovered that by treating a certain class of cements with a fat body in such a way as to cause a chemical combination to take place between the two that I can obtain a product far superior to that of Mas, in that such product not only renders cement water-repellent but also greatly increases the plasticity and sand-carrying capacity of the same. As stated above, Mas forms his product by merely coating the particles of his powdered lime with a coating of a fat. On the other hand, my improved product can only be formed by causing a chemical combination to take place between a special cement and the fat bodies employed by me.

It is accordingly an object of this invention to provide a composition for treating cement to render the cement not only water-repellent but also to increase the plasticity and sand-carrying capacity of the same.

It is a further object of this invention to provide a process for chemically combining a fat body and a special cement in order to produce a composition which, when added in a relatively small amount to cement, imparts to it very desirable characteristics.

Other and further important objects of this invention will become apparent from the following disclosures in the specification and claims.

I may prepare my improved composition by what I term either a "wet mixing method" or a "dry mixing method".

In both methods, the ingredients for imparting the desired properties to the cement are a fat such as tallow or the like, or a fatty acid, such as palmitic, stearic, or oleic, or an oil containing a fat or fatty acid such as cotton seed oil.

The class of cements to which I desire to restrict my invention includes hydraulic cement or any natural cement substantially free from basic oxides, such as calcium, magnesium or aluminum oxides. In other words, the cements employed are any natural or Portland cement not requiring access of air for carbonation to cause "set".

According to my preferred wet method, I employ tallow to furnish the fatty acid for my composition. I take 20 parts by weight of this substance and heat it to 90° C. to melt the same. I then add one part by weight of water and increase the temperature to the boiling point of water. To this hot mixture I then slowly add a cement such as defined above in finely divided form until 60 parts by weight have been added, maintaining the temperature at approximately 90 to 100° C. during the addition. The mixture is at this point of a dry consistency and is dumped from the mixer and allowed to cool.

An examination of the special cement composition thus formed shows that a chemical combination of the fatty acid, or acids, has actually taken place, presumably with the alkali or double alkali silicates of the cement. Proof of this lies in the fact that an ether extraction of the cement composition fails to show extraction of appreciable quantities of any fat or fatty acid.

My alternative method, referred to as my dry method, comprises adding the tallow to the cement in a dry state, without the addition of water, and converting the mixture to my novel composition by the application of heat as defined above.

While I have disclosed the temperatures in the above example as ranging from 90 to 100° C., it will be understood that such temperatures are not restrictive, as satisfactory results may be obtained by employing temperatures between the limits of 90 to 150° C. pressure being used for the higher temperatures.

In treating cement with my novel composition, I add approximately one percent of the composition to the burnt cement rock as it comes from the kiln and while it is still in an unground form. The mixture of the burnt cement rock and the special cement composition is then passed through the usual hammer mills and tube mills until it has been reduced to an air floated, uniform powder.

The amount of my composition that I add to the burnt cement rock varies according to the amount of fatty acid that is desired to incorporate in the finished cement. I usually add sufficient of the mixture to give a fatty acid content ranging between 0.1% and 5%. I have found however, that for best results a cement containing about 0.25% fatty acid is to be preferred.

A cement treated with my novel composition not only has the properties of greater plasticity and sand-carrying capacity but in addition has the following advantages over untreated cement or cement treated by the old processes.

Under the same grinding conditions cement rock to which has been added the special cement composition of my invention can be readily ground to a fineness which is several percent higher than was possible with untreated cement rock. This materially increases the capacity of the grinding equipment. Moreover, this cement does not tend to build up in the bins and hoppers in the mill and can be fed out of the packing machines into bags without the use of air to make it flow freely.

I am aware that numerous details of my process may be varied without departing from the spirit of my invention, and I therefore do not propose to limit myself in the patent granted excepted as necessitated by the prior art.

I claim as my invention:

1. A process of preparing a composition for addition to a hydraulic cement to increase its plasticity and water-proofing qualities, which comprises heating a mixture of a fatty acid substance, a relatively small quantity of water and an excess quantity of a hydraulic cement substantially free of free basic oxides at a temperature above 80° C. until substantially all of the fatty acid substance has reacted with the cement and the mixture is of a dry consistency and then allowing said mixture to cool.

2. A process of preparing a composition for addition to a hydraulic cement to increase its plasticity and water-proofing qualities, which comprises melting 20 parts of tallow, adding about 1 part of water to said melted tallow, heating said water and tallow to approximately its boiling point of water, adding thereto about 60 parts of a finely divided hydraulic cement substantially free of free basic oxides and maintaining the mixture at approximately 90° to 100° C. until the tallow has practically completely reacted with the cement and the mixture is of a dry consistency.

In testimony whereof I have hereunto subscribed my name at Utica, La Salle County, Ill.

SIDNEY G. SEATON.